US012797653B2

(12) United States Patent
Tushaus

(10) Patent No.: US 12,797,653 B2
(45) Date of Patent: Nov. 17, 2026

(54) ENERGY ABSORBING DEVICE FOR FALL PROTECTION SYSTEM

(71) Applicant: 3M INNOVATIVE PROPERTIES COMPANY, St. Paul, MN (US)

(72) Inventor: John T. Tushaus, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1115 days.

(21) Appl. No.: 17/596,744

(22) PCT Filed: Jun. 15, 2020

(86) PCT No.: PCT/IB2020/055586

§ 371 (c)(1),
(2) Date: Dec. 17, 2021

(87) PCT Pub. No.: WO2021/001711

PCT Pub. Date: Jan. 7, 2021

(65) Prior Publication Data

US 2022/0339477 A1 Oct. 27, 2022

Related U.S. Application Data

(60) Provisional application No. 62/870,330, filed on Jul. 3, 2019.

(51) Int. Cl.
*A62B 35/04* (2006.01)
*E04G 21/32* (2006.01)

(52) U.S. Cl.
CPC ............ *A62B 35/04* (2013.01); *E04G 21/329* (2013.01)

(58) Field of Classification Search
CPC ... A62B 35/04; A62B 35/005; A62B 35/0056; A62B 35/0068; A62B 35/0075; E04G 21/329
See application file for complete search history.

(56) References Cited

U.S. PATENT DOCUMENTS 4,060,278 A 11/1977 Maeyerspeer
5,799,760 A * 9/1998 Small .................... A62B 35/04 267/155

(Continued)

FOREIGN PATENT DOCUMENTS

CA 2122437 10/1995
CA 2489107 1/2006

(Continued)

OTHER PUBLICATIONS

"Instruction Manual—Metal energy absorber", Guardian, 12 pages.

(Continued)

*Primary Examiner* — Daniel P Cahn
*Assistant Examiner* — Jeremy C Ramsey
(74) *Attorney, Agent, or Firm* — Johannes P. M. Kusters; Aleksander Medved; Kenneth B. Wood

(57) ABSTRACT

An energy absorbing device includes a body having a first path of reduced strength extending from a first end to near a central axis of the body. The first path of reduced strength includes a plurality of perforations extending through the body and disposed adjacent to each other. The plurality of perforations is arranged in a first spiral shape. The body also includes a second path of reduced strength spaced apart from the first path of reduced strength. The second path of reduced strength extends from a second end to near the central axis of the body. The second path of reduced strength has a second spiral shape. Upon application of a force above a threshold at the first end and the second end in opposing directions, the body is configured to separate along the first path of reduced strength and the second path of reduced strength to absorb energy.

9 Claims, 12 Drawing Sheets

(56) References Cited

U.S. PATENT DOCUMENTS

| | | | | |
|---|---|---|---|---|
| 6,279,680 | B1 * | 8/2001 | Casebolt | E04G 21/329 188/371 |
| 2009/0133977 | A1 * | 5/2009 | Warren | F16F 7/003 188/371 |
| 2009/0194366 | A1 | 8/2009 | Parker | |
| 2010/0038925 | A1 | 2/2010 | Conner | |
| 2015/0299966 | A1 * | 10/2015 | Fulde | F16F 7/127 408/1 R |
| 2019/0314656 | A1 * | 10/2019 | Farrell | F16F 7/003 |

FOREIGN PATENT DOCUMENTS

| | | |
|---|---|---|
| GB | 2426563 | 11/2006 |
| GB | 2452336 | 3/2009 |
| KR | 20-0425822 | 9/2006 |
| WO | WO 2000-024470 | 5/2000 |
| WO | WO 2011-049674 | 4/2011 |

OTHER PUBLICATIONS

"Metal energy absorber—youtube", retrieved from internet [downloaded from internet on Jul. 31, 2019; published on Apr. 18, 2018], URL <https://www.youtube.com/watch?v=Nf9OtMhmG-I>, 1page.

"Metal energy absorber—Features and benefits", Guardian, 2 pages.

International Search report for PCT International Application No. PCT/IB2020/055586 mailed on Sep. 9, 2020, 3 pages.

* cited by examiner

ENERGY ABSORBING DEVICE FOR FALL PROTECTION SYSTEM

TECHNICAL FIELD

The present disclosure relates generally to an energy absorbing device for use with a fall protection system.

BACKGROUND

An energy absorbing device, such as a coiled or perforated energy absorber, is used in a fall protection system in order to absorb energy during fall of a user. More specifically, the energy absorbing device may be connected to a safety line, such as a horizontal lifeline, and/or a safety harness of the user associated with the fall protection system. During fall of the user, the energy absorbing device may uncoil and/or separate along a designated separation path in order to absorb energy in a gradual manner and arrest fall of the user.

Such energy absorbing devices may be typically fabricated using multiple manufacturing methods, such a forming, stamping, cutting, coiling, and so on, resulting in increased manufacturing complexity, manufacturing time, and manufacturing cost. Additionally, using multiple manufacturing methods may result in increased material usage, increased material wastage, increased physical size of finished product, and, thus, increased product bulk and shipping costs.

SUMMARY

In one aspect, an energy absorbing device for use with a fall protection system is provided. The energy absorbing device includes a body having a first end and a second end and defines a central axis therethrough. The body includes a first path of reduced strength extending from the first end to near the central axis of the body. The first path of reduced strength includes a plurality of perforations extending through the body and disposed adjacent to each other. The plurality of perforations is arranged in a first spiral shape. The body also includes a second path of reduced strength spaced apart from the first path of reduced strength. The second path of reduced strength extends from the second end to near the central axis of the body. The second path of reduced strength has a second spiral shape. Upon application of a force above a threshold at the first end and the second end in opposing directions, the body is configured to separate along the first path of reduced strength and the second path of reduced strength to absorb energy.

In another aspect, a fall protection system is provided. The fall protection system includes an object to be fall protected. The fall protection system also includes an energy absorbing device coupled operatively to the object and a structure. The energy absorbing device includes a body having a first end and a second end and defines a central axis therethrough. The body includes a first path of reduced strength extending from the first end to near the central axis of the body. The first path of reduced strength includes a plurality of perforations extending through the body and disposed adjacent to each other. The plurality of perforations is arranged in a first spiral shape. The body also includes a second path of reduced strength spaced apart from the first path of reduced strength. The second path of reduced strength extends from the second end to near the central axis of the body. The second path of reduced strength has a second spiral shape. Upon application of a force above a threshold at the first end and the second end in opposing directions, the body is configured to separate along the first path of reduced strength and the second path of reduced strength to absorb energy.

In another aspect, a horizontal lifeline system is provided. The horizontal lifeline system includes at least a pair of anchor supports. The horizontal lifeline system also includes a safety line extending between at least the pair of anchor supports. The horizontal lifeline system further includes an energy absorbing device coupled operatively to the safety line. The energy absorbing device includes a body having a first end and a second end and defines a central axis therethrough. The body includes a first path of reduced strength extending from the first end to near the central axis of the body. The first path of reduced strength includes a plurality of perforations extending through the body and disposed adjacent to each other. The plurality of perforations is arranged in a first spiral shape. The body also includes a second path of reduced strength spaced apart from the first path of reduced strength. The second path of reduced strength extends from the second end to near the central axis of the body. The second path of reduced strength has a second spiral shape. Upon application of a force above a threshold at the first end and the second end in opposing directions, the body is configured to separate along the first path of reduced strength and the second path of reduced strength to absorb energy.

In yet another aspect, a method of manufacturing an energy absorbing device is provided. The method includes providing a material blank. The method also includes forming a first path of reduced strength in the material blank by a material removal process. The first path of reduced strength includes a plurality of perforations extending through the material blank and disposed adjacent to each other. The plurality of perforations is arranged in a first spiral shape. The method further includes forming a second path of reduced strength in the material blank spaced apart from the first path of reduced strength by the material removal process. The second path of reduced strength has a second spiral shape.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

Figure 1:
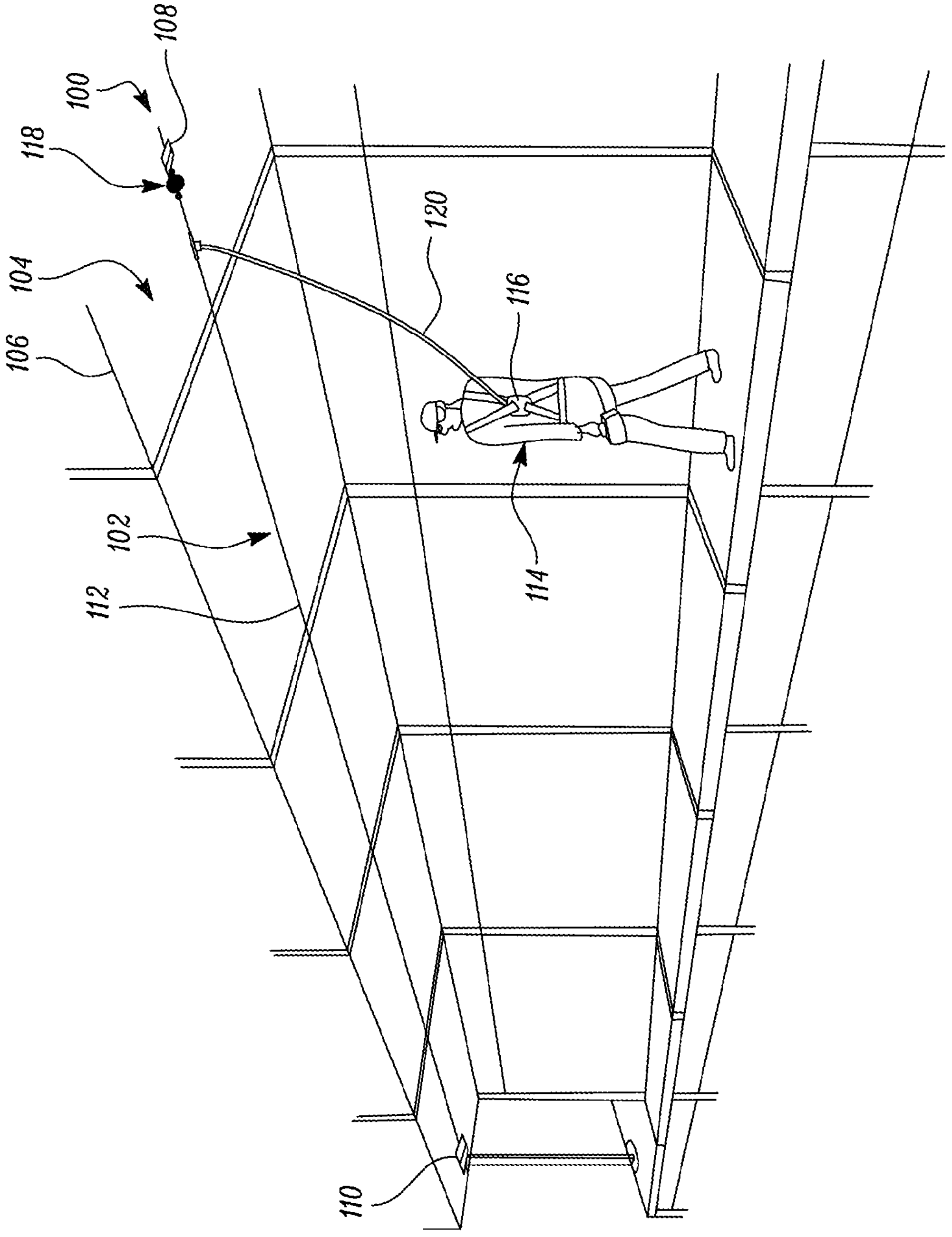
FIG. 1 is an exemplary representation of a fall protection system, according to one embodiment of the present disclosure.

Referring to FIG. 1, a perspective view of an exemplary fall protection system 100 is illustrated. More specifically, in the illustrated embodiment, the fall protection system 100 is a horizontal lifeline system 102. In other embodiments, the fall protection system 100 may be any other fall protection system, such as a vertical lifeline system. The horizontal lifeline system 102 will be hereinafter interchangeably referred to as the "system 102". The system 102 includes a structure 104. The structure 104 includes a base support 106. The base support 106 is adapted to support other components of the system 102 thereon. In the illustrated embodiment, the base support 106 is a roof surface. In other embodiments, the base support 106 may be any other support surface, such as a floor surface, a wall surface, a beam and so on.

The structure 104 also includes at least a pair of anchor supports 108, 110. In other embodiments, the structure 104 may include any other number of anchor supports, based on application requirements. The structure 104 further includes a safety line 112. The safety line 112 is coupled to and extends between at least the pair of anchor supports 108, 110. As such, each of the pair of anchor supports 108, 110 is adapted to support the safety line 112. The safety line 112 may be any safety cable, such as a steel-based safety cable. In the illustrated embodiment, the safety line 112 is adapted to be removably coupled to a user 114, such as a construction personnel. More specifically, the safety line 112 is removably coupled to a personal protective equipment 116 via a safety rope 120. The safety rope 120 may be any component that couples the personal protective equipment 116 to the safety line 112. In various embodiments, the safety rope 120 can be a cable, a rope, a web lanyard, a self-retracting lifeline (SRL), and the like.

The personal protective equipment 116 is adapted to be removably disposed on the user 114. In the illustrated embodiment, the personal protective equipment 116 is a full body safety harness. In other embodiments, the personal protective equipment 116 may be a safety body belt or a safety waist belt. It should be noted that, in other embodiments, the structure 104 may be removably coupled to any other object (not shown), such as a tool, an equipment, and so on, based on application requirements. In such a situation, the object may be coupled operatively to the safety line 112 or any of the pair of anchor supports 108, 110 via the safety rope 120, a lanyard, a tether, and so on, based on application requirements. It should be noted that, in other embodiments, the structure 104 may alternatively include a movable or repositionable structure (not shown), such as an aerial lift, an elevated platform, a movable ladder, and so on, based on application requirements.

The system 102 also includes an energy absorbing device 118. The energy absorbing device 118 will be hereinafter interchangeably referred to as the "device 118". In the illustrated embodiment, the device 118 is operatively coupled to the safety line 112. As such, the device 118 is coupled to one of the pair of anchor supports 108, 110, such as the anchor support 108 in this case, and the safety line 112. In other embodiments, the device 118 may be coupled operatively to the personal protective equipment 116 and the structure 104, such as via the safety rope 120. In some embodiments, the device 118 can be provided at either end of the safety rope 120. In other embodiments, the device 118 can be inline or integral with the safety rope 120. In an example, the device 118 can be provided between the personal protective equipment 116 and a self-retracting lifeline. In another example, the device 118 can be inline or integral with the self-retracting lifeline. In yet other embodiments when the system 102 may be employed to provide fall protection to the object, such as the tool, the equipment, and so on, the device 118 may be coupled operatively to the object and the structure 104. In such a situation, the device 118 may be coupled operatively to the safety rope 120, the lanyard, the tether, and so on connected between the object and the structure 104. It should be noted that the system 102 may include additional one or more coupling members not described herein, such as safety hooks, fixed connectors, slotted connectors, rolling connectors, sliding connectors, carabiners, and so on, based on application requirements.

Figure 2:
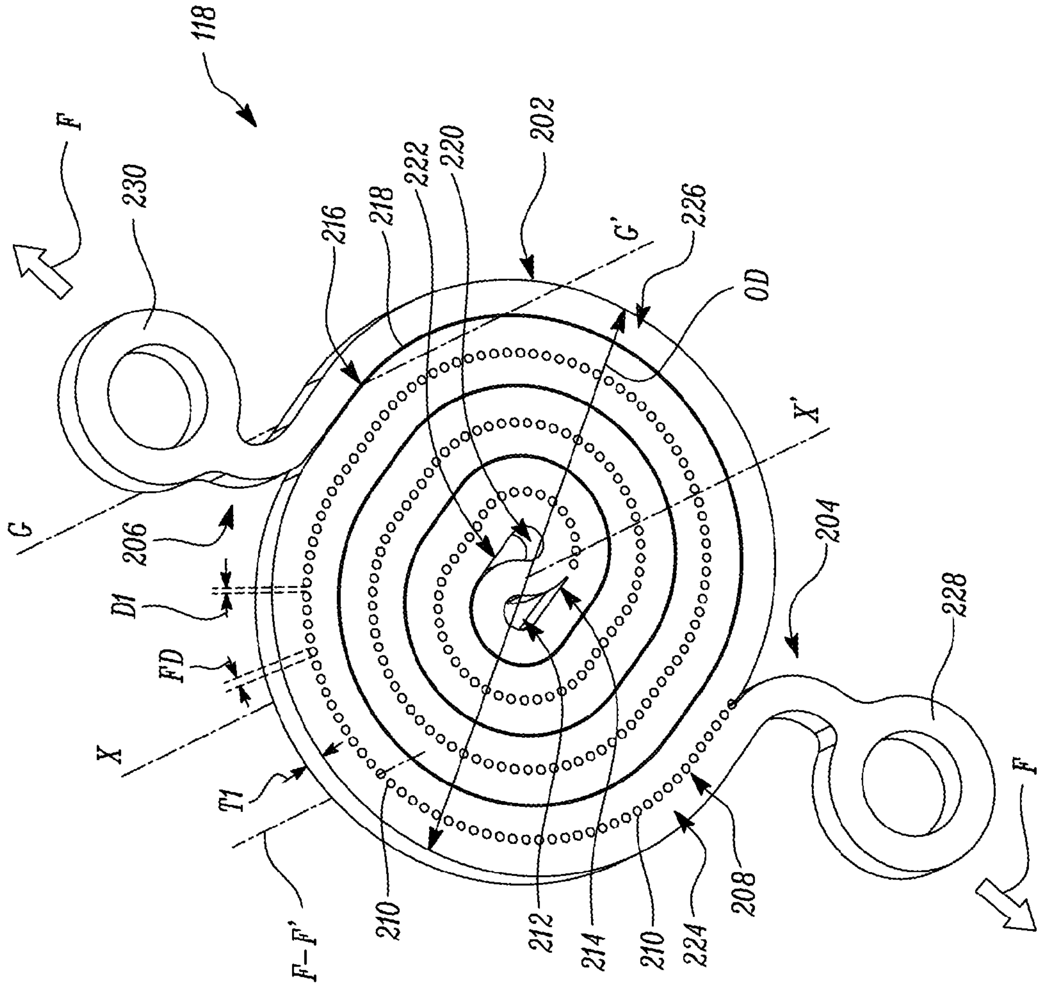
FIG. 2 is a perspective view of an energy absorbing device, according to one embodiment of the present disclosure.

Referring to FIG. 2, a perspective view of the device 118 is illustrated. The device 118 includes a body 202. In the illustrated embodiment, the body 202 has a substantially circular configuration defining a central axis X-X' and an outer diameter "OD". In other embodiments, the device 118 may have any other configuration, such as elliptical. The body 202 also has a substantially flat configuration defining a thickness "T1". The body 202 includes a first end 204 and second end 206. In the illustrated embodiment, the second end 206 is disposed substantially opposite to the first end 204. In other embodiments, the second end 206 may be disposed at any location on the body 202 relative to the first end 204.

The body 202 also includes a first path of reduced strength 208. The first path of reduced strength 208 will be hereinafter interchangeably referred to as the "first path 208". The first path 208 extends from the first end 204 to near the central axis X-X' of the body 202. In the illustrated embodiment, the first path 208 includes a plurality of first perforations 210. The plurality of first perforations 210 is arranged in a first spiral shape, such that the plurality of first perforations 210 extends from the first end 204 to near the central axis X-X' of the body 202 in a substantially spiral configuration. Each of the plurality of first perforations 210 extends through the body 202 and is disposed adjacent to each other. Also, each of the plurality of the first perforations 210 extends parallel to the central axis X-X'. More specifically, each of the plurality of first perforations 210 defines a first perforation axis F-F', such that the first perforation axis F-F' is disposed substantially parallel and spaced apart from the central axis X-X'.

In the illustrated embodiment, each of the plurality of first perforations 210 is spaced apart from one another by a first distance "D1", i.e., adjacent first perforations 210 are separated by the first distance "D1". In the illustrated embodiment, the first perforations 210 are uniformly arranged along the first path 208 such that a value of the first distance "D1" is substantially equal. In other embodiments, the first perforations 210 may be non-uniformly arranged along the first path 208 such that the value of the first distance "D1" may vary. In the illustrated embodiment, each of the plurality of first perforations 210 has a substantially circular configuration. Accordingly, each of the plurality of first perforations 210 defines a first diameter "FD". In the illustrated embodiment, an actual value of the first diameter "FD" of each of the plurality of first perforations 210 is equal to one another. In other embodiments, the actual value of the first diameter "FD" of one or more of the plurality of first perforations 210 may be different from one another. In other embodiments, one or more of the plurality of first perforations 210 may have any other configuration, such as rectangular, triangular, elliptical, and so on, based on application requirements.

Additionally, the body 202 includes a first hole 212. The first hole 212 is disposed near to the central axis X-X' and aligned with the first path 208. In the illustrated embodiment, the first hole 212 has a substantially teardrop-shaped configuration. Accordingly, the first hole 212 defines a first tapered end 214, such that the first tapered end 214 is aligned with the first path 208. Specifically, the first tapered end 214 is aligned with the first perforation 210 disposed at an end of the first path 208 near the central axis X-X'. In other embodiments, the first hole 212 may have any other configuration, such as circular, elliptical, and so on, based on application requirements.

The body 202 also includes a second path of reduced strength 216. The second path of reduced strength 216 will be hereinafter interchangeably referred to as the "second path 216". The second path 216 is disposed spaced apart from the first path 208. The second path 216 extends from the second end 206 to near the central axis X-X' of the body 202. In the illustrated embodiment, the second path 216 includes a groove 218. The second path 216 or the groove 218 is arranged in a second spiral shape, such that the second path 216 or the groove 218 extends from the second end 206 to near the central axis X-X' of the body 202 in a substantially spiral configuration. Also, the second spiral shape is concentric with the first spiral shape. Accordingly, the first path 208 or the plurality of first perforations 210 is disposed concentrically with the second path 216 or the groove 218. Further, the first and second spiral shapes are substantially similar to each other. In other embodiments, the first and second spiral shapes may be different from each other. The groove 218 extends through the body 202 and is substantially parallel to the central axis X-X'. More specifically, the groove 218 defines a groove axis G-G', such that the groove axis G-G' is disposed substantially parallel to and spaced apart from the central axis X-X' and the first perforation axis F-F'. In other embodiments, the second path 216 may include any other discontinuity, such as a plurality of perforations.

Additionally, the body 202 includes a second hole 220. The second hole 220 is disposed near to the central axis X-X' and aligned with the second path 216. Also, the second hole 220 is disposed spaced apart from the first hole 212. In the illustrated embodiment, the second hole 220 has a substantially teardrop-shaped configuration. Accordingly, the second hole 220 defines a second tapered end 222, such that the second tapered end 222 is aligned with the second path 216 or the groove 218. In other embodiments, the second hole 220 may have any other configuration, such as circular, elliptical, and so on, based on application requirements.

The body 202 also includes a first region 224 and a second region 226. The first region 224 is defined by each of the first path 208, the second path 216, and the first hole 212. More specifically, the first region 224 extends from the first end 204 up to the central axis X-X' of the body 202 in a substantially spiral shape. Also, the second region 226 is defined by each of the first path 208, the second path 216, and the second hole 220. More specifically, the second region 226 extends from the second end 206 up to the central axis X-X' of the body 202 in a substantially spiral shape. Additionally, the second region 226 is disposed concentric with the first region 224. As such, in the illustrated embodiment, the first region 224 and the second region 226 are connected to each other via the first path 208 or the plurality of first perforations 210 and separated from each other via the second path 216 or the groove 218.

The body 202 also includes a first coupler 228. The first coupler 228 is disposed on the first end 204. More specifically, the first coupler 228 is connected to the first region 224 at the first end 204. In the illustrated embodiment, the first coupler 228 has a substantially circular configuration. In other embodiments, the first coupler 228 may have any other configuration, such as an elliptical configuration, a hook shaped configuration, and so on, based on application requirements. The body 202 also includes a second coupler 230. The second coupler 230 is disposed on the second end 206. More specifically, the second coupler 230 is connected to the second region 226 at the second end 206. In the illustrated embodiment, the second coupler 230 has a substantially circular configuration. In other embodiments, the second coupler 230 may have any other configuration, such as an elliptical configuration, a hook shaped configuration, and so on, based on application requirements.

Each of the first coupler 228 and the second coupler 230 is adapted to be connected to a load (not shown). As such, each of the first coupler 228 and the second coupler 230 is adapted to apply a force "F" in opposing directions to the body 202 at the first end 204 and the second end 206. Referring to FIG. 1, in the illustrated embodiment, the first coupler 228 is coupled to the anchor support 108 and the second coupler 230 is coupled to the safety line 112. In another embodiment, each of the first and second couplers 228, 230 may be coupled to the safety line 112. In another embodiment, the first coupler 228 may be coupled to the personal protective equipment 116 and the second coupler 230 may be coupled to the safety rope 120, or vice versa. In an example, the first coupler 228 may be coupled to the personal protective equipment 116 and the second coupler 230 may be coupled to the self-retracting lifeline, or vice versa. In another example, the first coupler 228 may be coupled to the self-retracting lifeline and the second coupler 230 may be coupled to the structure 104, or vice versa. In yet another example, the first and second couplers 228, 230 may be both connected to the self-retracting lifeline such that the device 118 is inline or integral with the self-retracting lifeline. Upon application of the force "F" above a threshold at the first end 204 and the second end 206 in opposing directions, such as during a fall of the user 114, the body 202 is configured to separate along the first path 208 and the second path 216 to absorb energy. More specifically, the first region 224 and the second region 226 are adapted to separate along the first path 208 and the second path 216 and straighten out to absorb fall energy.

Figure 3A:
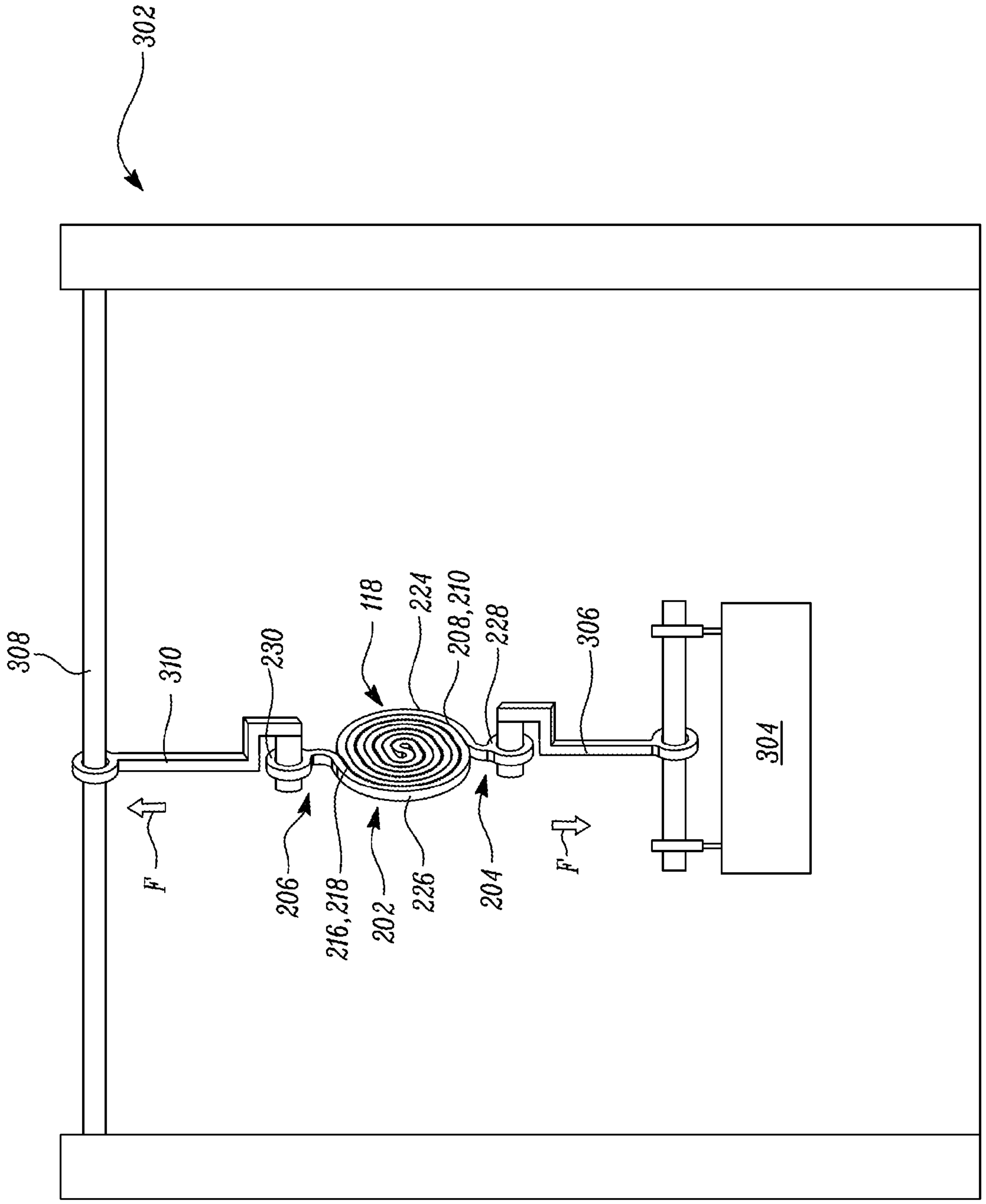
FIG. 3A is a schematic representation of a test setup, according to one embodiment of the present disclosure.
Figure 3B:
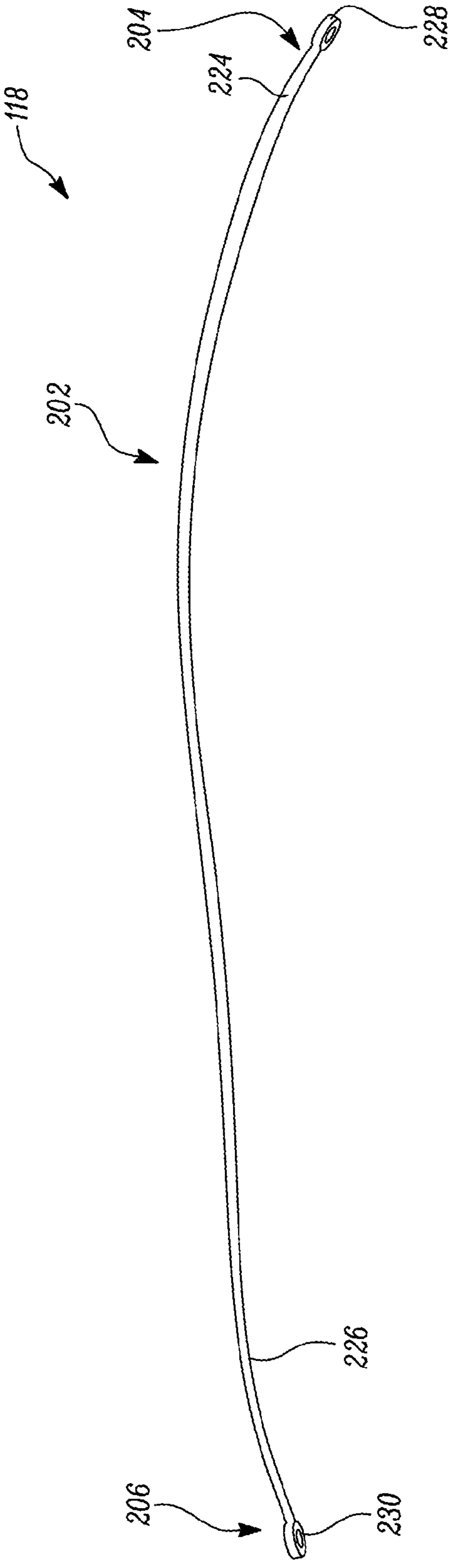
FIG. 3B is a perspective view of a test specimen, according to one embodiment of the present disclosure.

Referring to FIG. 3A, an exemplary test setup 302 for the device 118 is illustrated. The test setup 302 may be employed for a static test or a dynamic test of the device 118. In the illustrated test setup 302, the first coupler 228 is connected to an exemplary predefined load 304 via a first link 306. Also, the second coupler 230 is connected to a fixed point 308 via a second link 310. The static test refers to a suspended test of the predefined load 304 connected to the device 118 for a predefined time period. The dynamic test refers to a freefall test of the predefined load 304 connected to the device 118 from a predefined height. As such, due to the predefined load 304, the force "F" above the threshold is applied to the body 202 of the device 118 at the first end 204 and the second end 206 in opposing directions in order to replicate the fall of the user 114. Accordingly, during the fall of the user 114, the plurality of first perforations 210 may tear and the groove 218 may expand to separate the first region 224 and the second region 226 from each other in order to straighten out each of the first region 224 and the second region 226, as shown in FIG. 3B, and absorb fall energy to provide shock absorption. Further, each of the first hole 212 and the second hole 220 may prevent further separation of the first region 224 and the second region 226 near the central axis X-X' after straightening.

Figure 4A:
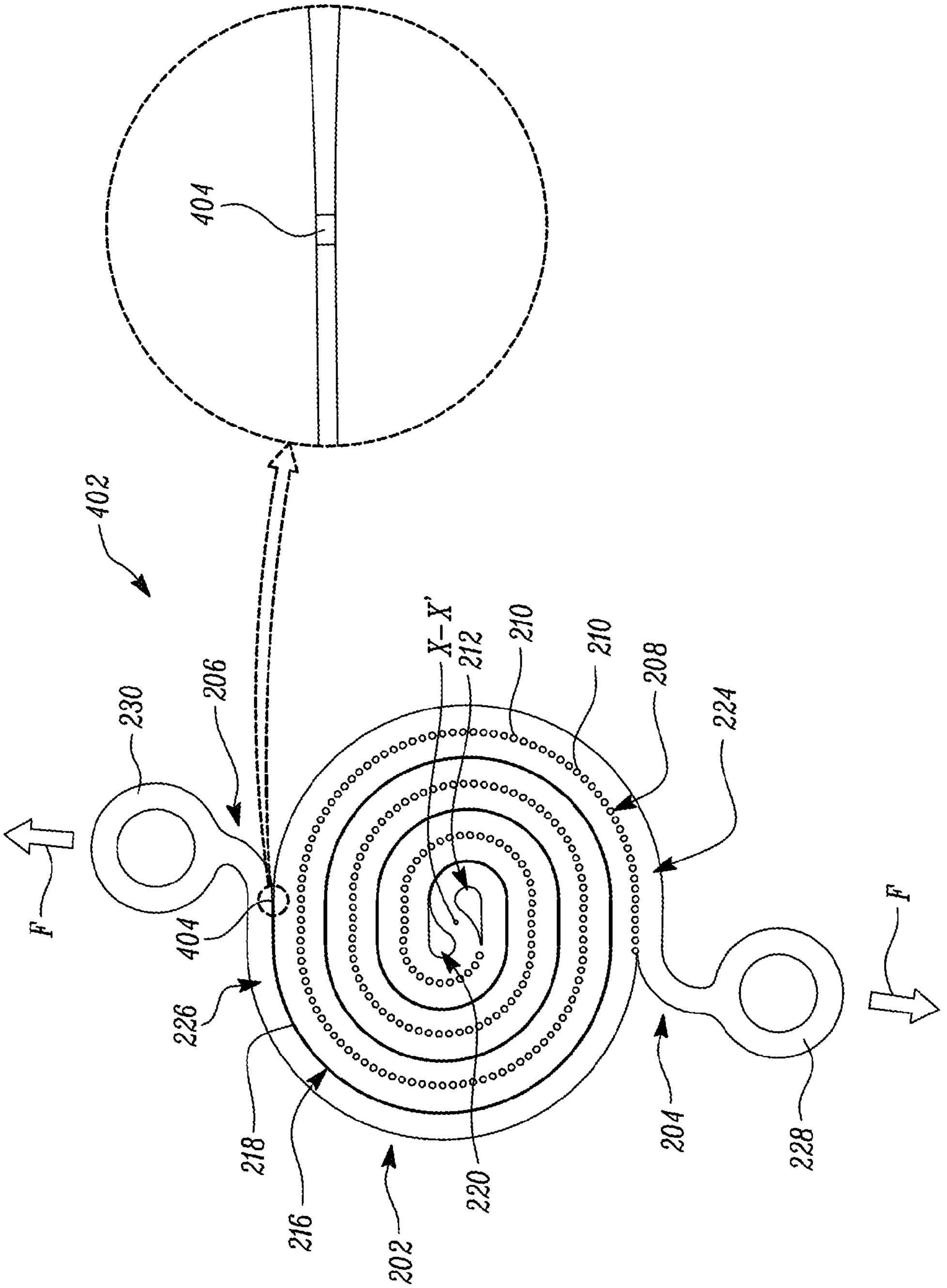
FIG. 4A is a perspective view of another energy absorbing device, according to another embodiment of the present disclosure.

Referring to FIG. 4A, another embodiment of a device 402 is illustrated. The device 402 is substantially similar to the device 118 of FIG. 2. As such, the device 402 includes the body 202 having the first end 204 and the second end 206, the first path 208 or the plurality of first perforations 210, the first hole 212, the second path 216 or the groove 218, the second hole 220, the first region 224, the second region 226, the first coupler 228, and the second coupler 230. Additionally, the device 402 includes a fuse bridge 404 disposed in the second path 216 or the groove 218. In the illustrated embodiment, the fuse bridge 404 is disposed adjacent to the second end 206 of the body 202. In other embodiments, the fuse bridge 404 may be disposed at any location within the second path 216 or the groove 218, based on application requirements. The fuse bridge 404 is adapted to provide an increased initial resistance to separation of the second path 216 or the groove 218 upon application of the force "F" above the threshold at the first end 204 and the second end 206 in opposing directions. In some examples, multiple such fuse bridges 404 may be provided.

Figure 4B:
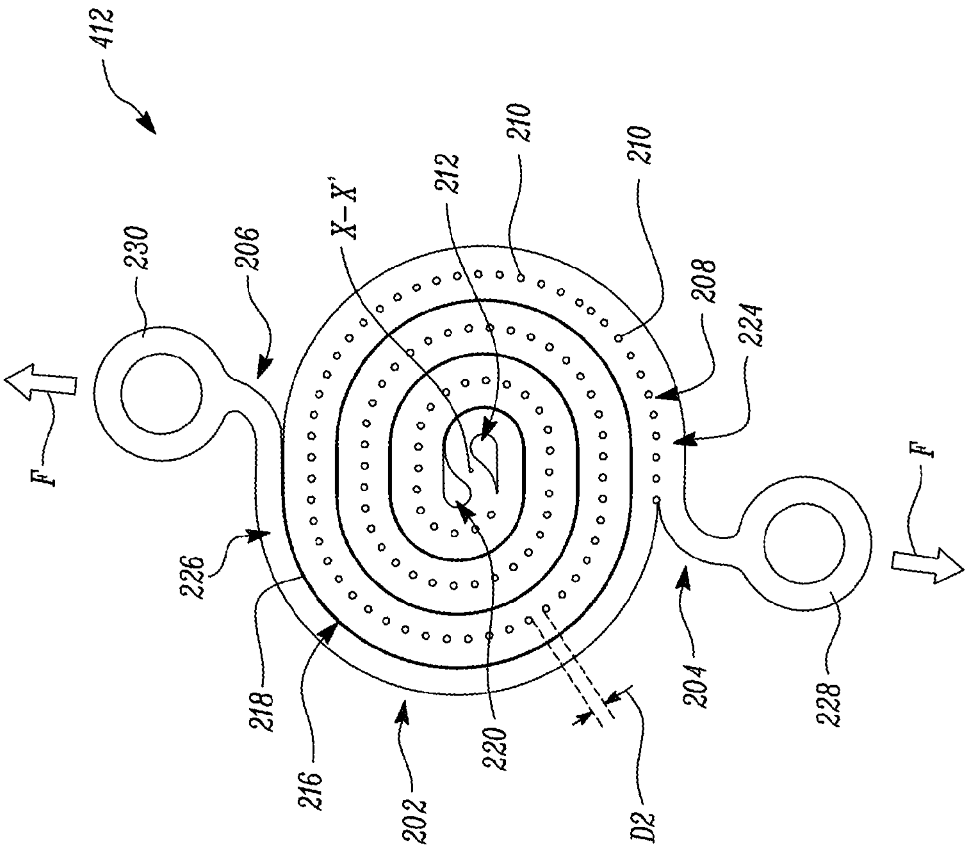
FIG. 4B is a perspective view of another energy absorbing device, according to another embodiment of the present disclosure.

Referring to FIG. 4B, another embodiment of a device 412 is illustrated. The device 412 is substantially similar to the device 118 of FIG. 2. As such, the device 412 includes the body 202 having the first end 204 and the second end 206, the first path 208 or the plurality of first perforations 210, the first hole 212, the second path 216 or the groove 218, the second hole 220, the first region 224, the second region 226, the first coupler 228, and the second coupler 230. In the illustrated embodiment, the first perforations 210 are spaced apart from one another by a second distance "D2", such that the second distance "D2" is greater than the first distance "D1" between the first perforations 210 of the device 118.

Figure 4C:
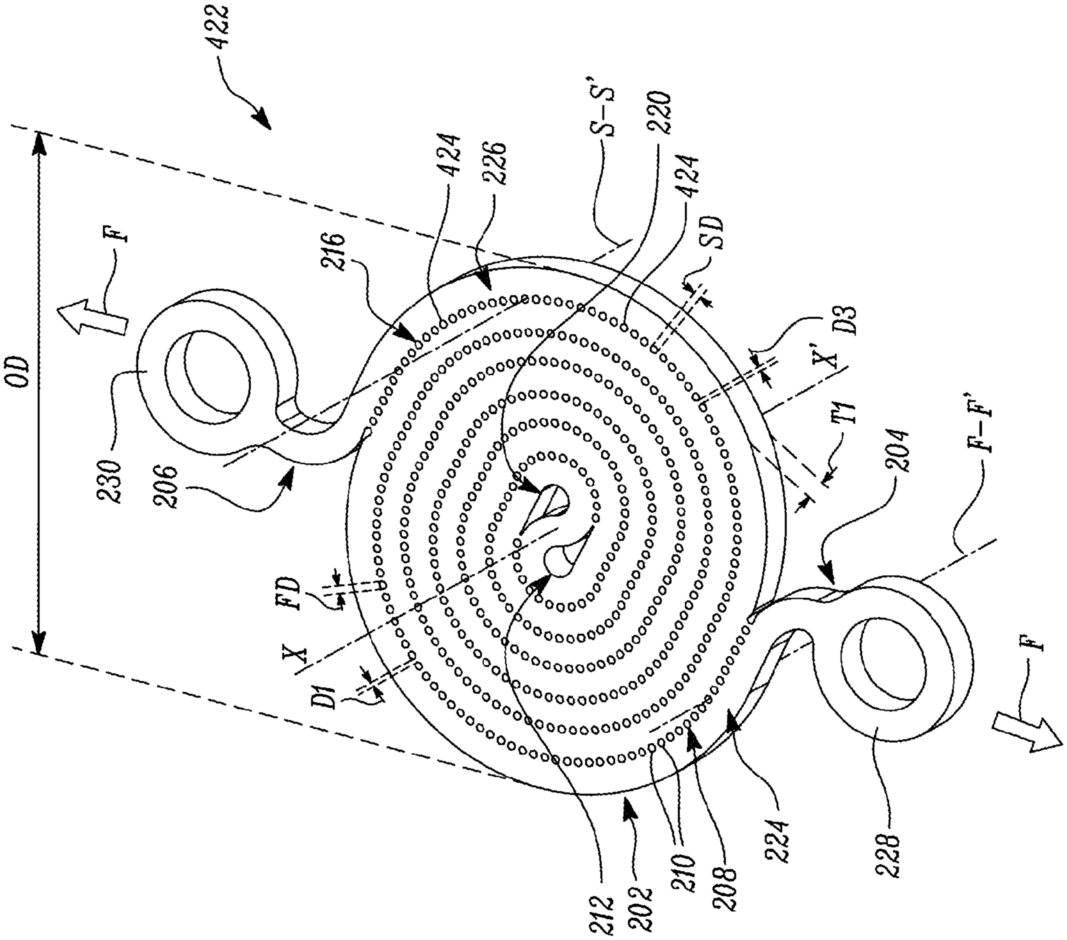
FIG. 4C is a perspective view of another energy absorbing device, according to another embodiment of the present disclosure.

Referring to FIG. 4C, another embodiment of a device 422 is illustrated. The device 422 is substantially similar to the device 118 of FIG. 2. As such, the device 422 includes the body 202 having the first end 204 and the second end 206, the first path 208 or the plurality of first perforations 210, the first hole 212, the second hole 220, the first region 224, the second region 226, the first coupler 228, and the second coupler 230. In the illustrated embodiment, the second path 216 includes a plurality of second perforations 424. Each of the plurality of second perforations 424 extends through the body 202 and is disposed adjacent to each other. Also, each of the plurality of the second perforations 424 extends substantially parallel to the central axis X-X'. More specifically, each of the plurality of second perforations 424 defines a second perforation axis S-S', such that the second perforation axis S-S' is disposed substantially parallel to and spaced apart from the central axis X-X'.

In the illustrated embodiment, the plurality of second perforations 424 are spaced apart from one another by a third distance "D3", i.e., adjacent second perforations 424 are separated by the third distance "D3". In the illustrated embodiment, the second perforations 424 are uniformly arranged along the second path 216 such that a value of the third distance "D3" is substantially equal. In other embodiments, the second perforations 424 may be non-uniformly arranged along the second path 216 such that the value of the third distance "D3" may vary. In the illustrated embodiment, each of the plurality of second perforations 424 has a substantially circular configuration. Accordingly, each of the plurality of second perforations 424 defines a second diameter "SD". In the illustrated embodiment, an actual value of the second diameter "SD" of each of the plurality of second perforations 424 is equal to one another. In other embodiments, the actual value of the second diameter "SD" of one or more of the plurality of second perforations 424 may be different from one another.

Also, in the illustrated embodiment, the second diameter "SD" is equal to the first diameter "FD". In other embodiments, the second diameter "SD" may be different from the first diameter "FD". Also, in the illustrated embodiment, the third distance "D3" is equal to the first distance "D1". In other embodiments, the third distance "D3" may be different from the first distance "D1". In other embodiments, one or more of the plurality of second perforations 424 may have any other configuration, such as rectangular, triangular, elliptical, and so on, based on application requirements. As such, in the illustrated embodiment, the first region 224 and the second region 226 are connected to each other via each the first path 208 or the plurality of first perforations 210 and the second path 216 or the plurality of second perforations 424.

Figure 5A:
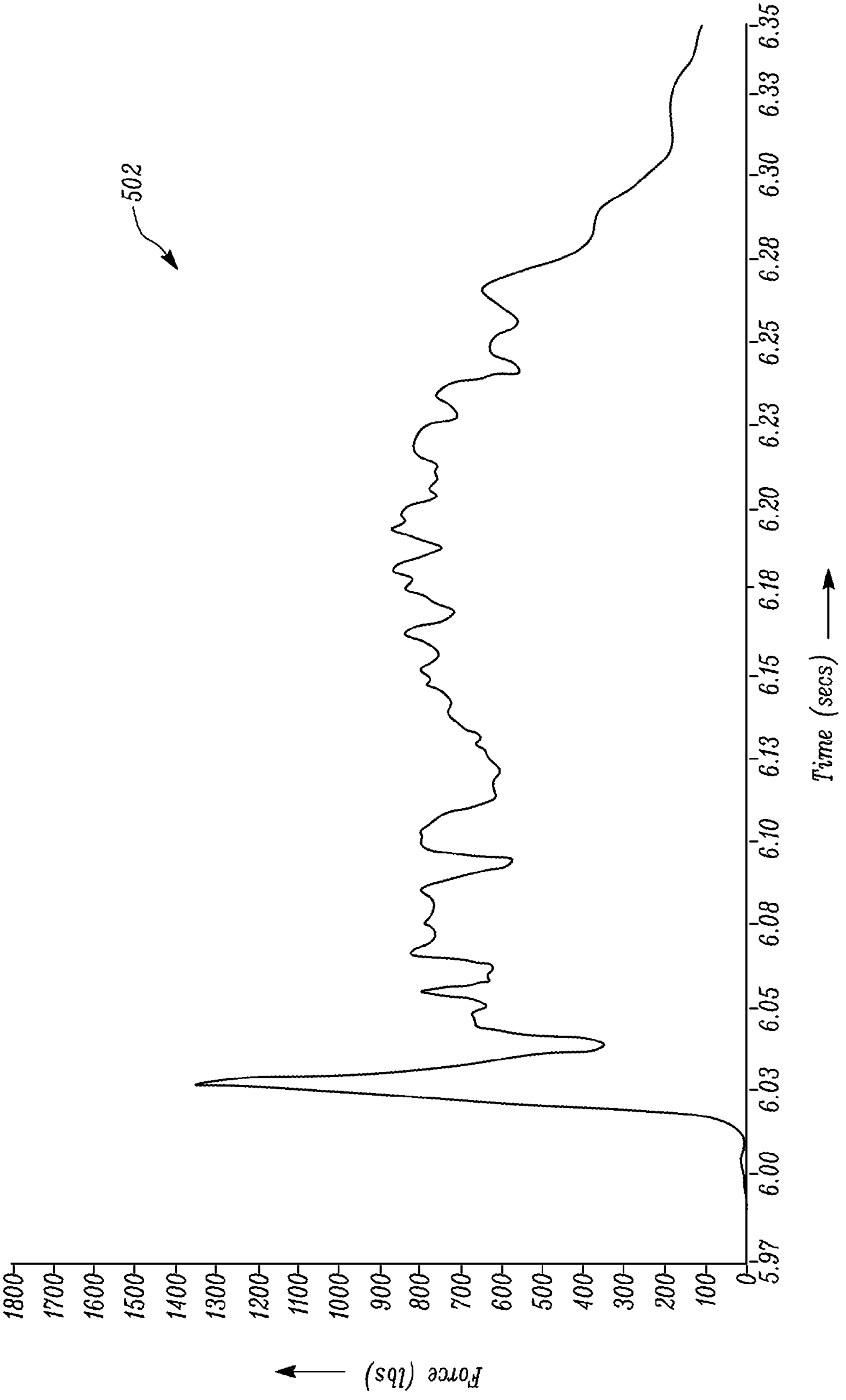
FIGS. 5A, 5B, and 5C are graphical representations of different test results, according to one embodiment of the present disclosure.

Referring to FIG. 5A, a graphical representation of a test result of the device 422 is illustrated. The device 422 includes the thickness "T1" of 0.25 inches (in), the outer diameter "OD" of 3.50 in, the first diameter "FD" of 0.050 in, the second diameter "SD" of 0.050 in, the first distance "D1" of 0.080 in, the third distance "D3" of 0.080 in, an initial length of 6 in, and a straightened length of 44 in. The graphical representation shows a plot 502 of the force "F" absorbed by the device 422 against time when a predefined load was applied to the first end 204 of the device 422. More specifically, during the test, the first end 204 was connected to the predefined load and the second end 206 was connected to the fixed point 308. The predefined load was then allowed to freefall from a height of 3 ft relative to the device 422. As shown in the accompanying figure, the plot 502 shows a substantially flat energy distribution profile between approximately 6.04 seconds (secs) and 6.28 secs. During the test, a maximum force absorbed by the device 422 was approximately 1357 pounds (lbs), an average force absorbed by the device 422 was approximately 733 lbs, and an arrest distance was approximately 17 in. The arrest distance refers to total lengthening distance of the body 202 of the device 422 due to separation of each of the first path 208 and the second path 216 without shearing of the first region 224 and the second region 226 from one another near the central axis X-X' and/or shearing of any of the first region 224 and the second region 226.

Figure 5B:
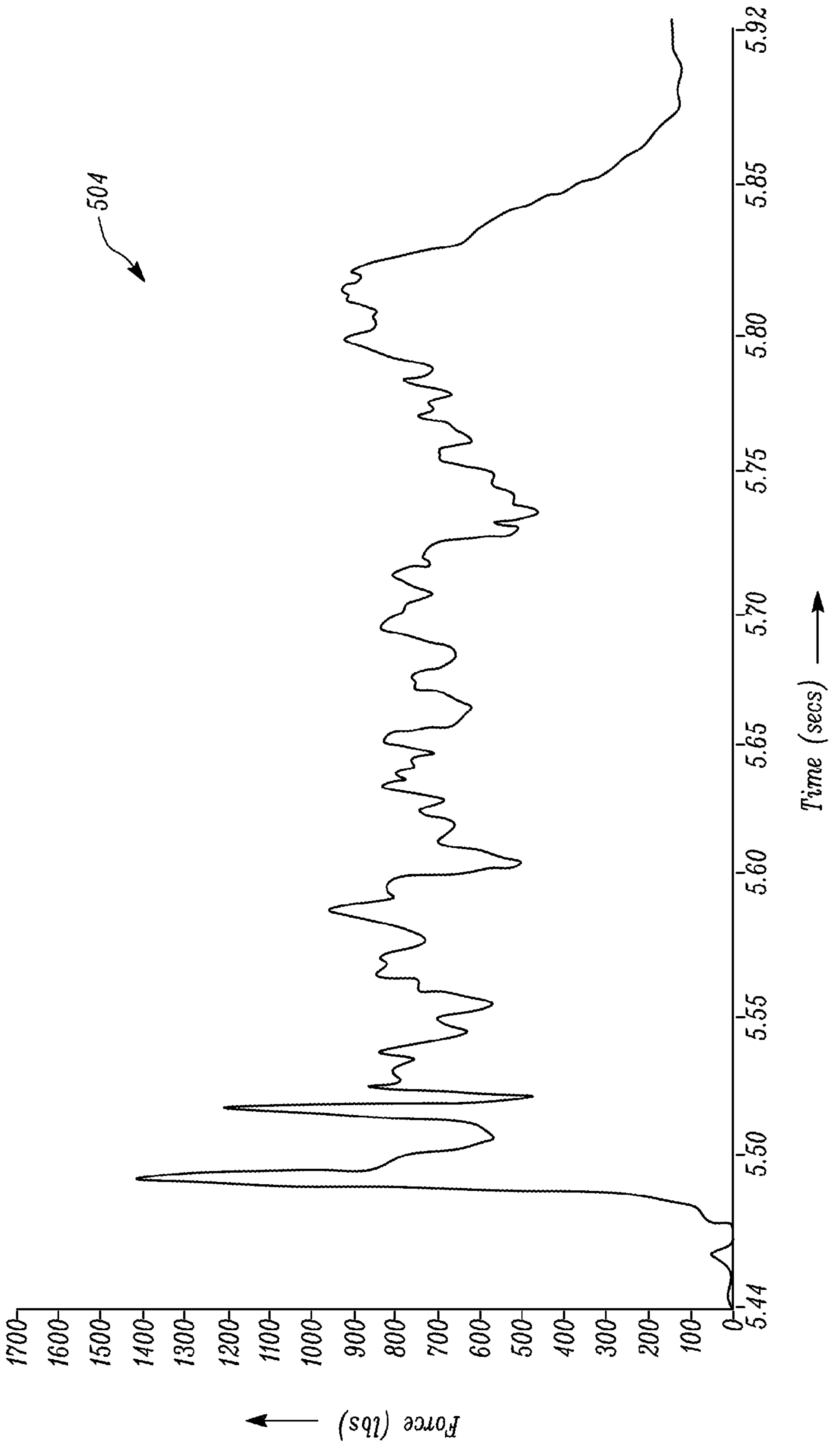

Referring to FIG. 5B, a graphical representation of another test result of the device 422 is illustrated. The graphical representation shows a plot 504 of force "F" absorbed by the device 422 against time when another predefined load was applied to the first end 204 of the device 422. More specifically, during the test, the first end 204 was connected to the predefined load and the second end 206 was connected to the fixed point 308. The predefined load was then allowed to freefall from a height of 5 ft relative to the device 422. As shown in the accompanying figure, the plot 504 shows a substantially flat energy distribution profile between approximately 5.50 secs and 5.83 secs. During the test, the maximum force absorbed by the device 422 was approximately 1333 lbs, the average force absorbed by the device 422 was approximately 712 lbs, and the arrest distance was approximately 32.50 in.

Figure 5C:
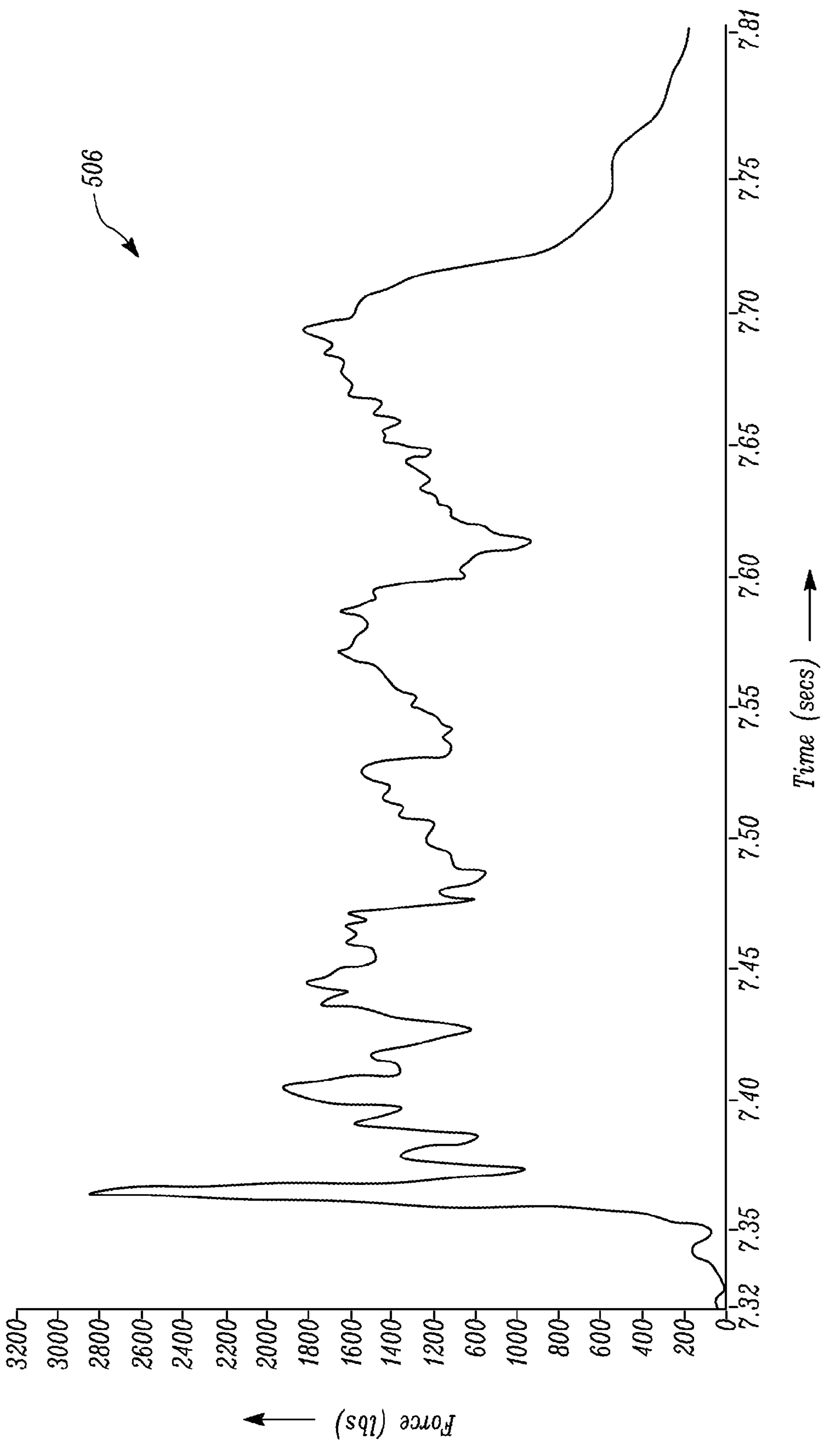

Referring to FIG. 5C, a graphical representation of another test result of the device 422 is illustrated. In the illustrated test, two devices 422 were disposed side-by-side to each other (not shown). The graphical representation shows a plot 506 of force "F" absorbed by the two devices 422 against time when another predefined load was applied to the first end 204 of each of the two devices 422. More specifically, during the test, the first end 204 of each of the two devices 422 was connected to the predefined load and the second end 206 of each of the two devices 422 was connected to the fixed point 308. The predefined load was then allowed to freefall from the height of 5 ft relative to the device 422. As shown in the accompanying figure, the plot 506 shows a substantially flat energy distribution profile between approximately 7.37 secs and 7.71 secs. During the test, the maximum force absorbed by the device 422 was approximately 2707 lbs, the average force absorbed by the device 422 was approximately 1348 lbs, and the arrest distance was approximately 31.50 in.

Figure 6:
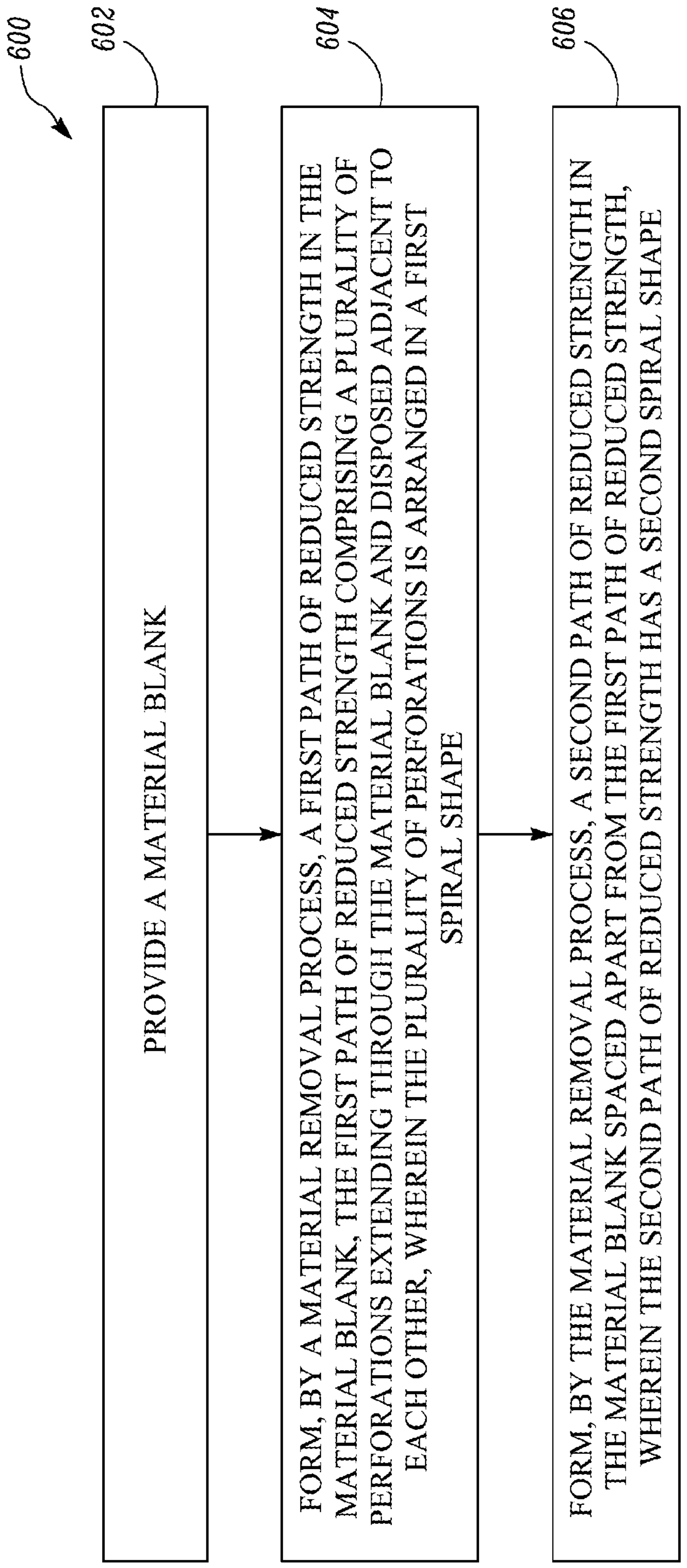
FIG. 6 is a flowchart of a method of manufacturing the energy absorbing device of FIGS. 2, 4A, 4B, and 4C, according to one embodiment of the present disclosure.
Figure 7:
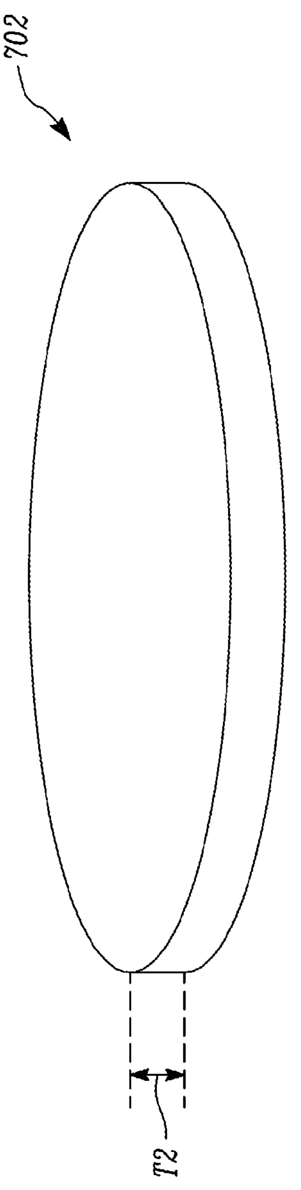
FIG. 7 is a perspective view of a material blank, according to one embodiment of the present disclosure.

Referring to FIG. 6, a flowchart of a method 600 of manufacturing the device 118, 402, 412, 422 is illustrated. At step 602, a material blank 702 (shown in FIG. 7) is provided. In the illustrated embodiment, the material blank 702 has a substantially flat and circular configuration defining a thickness "T2". In the illustrated embodiment, the thickness "T2" of the material blank 702 is equal to the thickness "T1" of the body 202 of the device 118, 402, 412, 422. In other embodiments, the thickness "T2" of the material blank 702 may be different from the thickness "T1" of the body 202 of the device 118, 402, 412, 422. Also, in other embodiments, the material blank 702 may have any other configuration, such as rectangular, elliptical, and so on. Also, the material blank 702 may be made of any metal or an alloy, such as steel, and so on. The material blank 702 may be manufactured using any process, such as casting, forging, fabrication, machining, additive manufacturing, and so on, based on application requirements.

At step 604, the first path 208 is formed in the material blank 702 by a material removal process. In one embodiment, the material removal process may be a laser cutting process using a laser cutting tool (not shown). In another embodiment, the material removal process may be a fluid jet cutting process, such as a water jet cutting process or an abrasive fluid jet cutting process, using a jet nozzle tool (not shown). In yet another embodiment, the material removal process may be other cutting process, such as milling, wire Electrical Discharge Machining (EDM), and so on. In the illustrated embodiment, the first path 208 includes a plurality of first perforations 210, such that the plurality of first perforations 210 extend through the material blank 702 and are disposed adjacent to each other. Also, the plurality of first perforations 210 is arranged in the first spiral shape. More specifically, the laser cutting tool or the jet nozzle tool may drill a number of first perforations 210 in quick succession along the first spiral shape in order to form the plurality of first perforations 210 or the first path 208 in the material blank 702.

At step 606, the second path 216 is formed in the material blank 702 by the material removal process. The second path 216 is spaced apart from the first path 208. Also, the second path 216 has the second spiral shape. In the illustrated embodiment, as shown in FIGS. 2, 4A, and 4B, the second path 216 includes the groove 218. More specifically, the laser cutting tool or the jet nozzle tool may drill the groove 218 in a continuous manner in the second spiral shape in order to form the second path 216 in the material blank 702. In another embodiment, as shown in FIG. 4C, the second path 216 includes the plurality of second perforations 424, such that the plurality of second perforations 424 extend through the material blank 702 and are disposed adjacent to each other. More specifically, the laser cutting tool or the jet nozzle tool may drill a number of second perforations 424 in quick succession along the second spiral shape in order to form the plurality of second perforations 424 or the second path 216 in the material blank 702.

Additionally, each of the first hole 212 and the second hole 220 is formed in the material blank 702 by the material removal process. Each of the first hole 212 and the second hole 220 is formed spaced apart from one another and adjacent to the central axis X-X' of the body 202. Each of the first hole 212 and the second hole 220 has a substantially teardrop-shaped configuration. Also, each of the first hole 212 and the second hole 220 is formed in the material blank 702, such that the first tapered end 214 of the first hole 212 is aligned with the first path 208 and the second tapered end 222 of the second hole 220 is aligned with the second path 216. More specifically, the laser cutting tool or the jet nozzle tool may drill two holes adjacent to the central axis X-X' having the teardrop-shaped configuration in order to form each of the first hole 212 and the second hole 220 in the material blank 702. Further in some embodiments, as shown in FIG. 4A, the fuse bridge 404 is formed within the second path 216 by the material removal process. More specifically, during forming of the second path 216 or the groove 218, the laser cutting tool or the jet nozzle tool may skip a portion of the material blank 702 in order to form the fuse bridge 404.

The device 118, 402, 412, 422 provides a simple, efficient, and cost-effective energy absorber manufactured using a single step cutting process, such as the laser cutting process or the fluid jet cutting process. As such, the device 118, 402, 412, 422 may be manufactured without using additional forming processes, such as cutting, coiling, and so on, required for manufacturing of conventional coiled energy absorbers, in turn, reducing manufacturing time, costs, and associated machinery. The method 600 also provides manufacturing of the device 118, 402, 412, 422 with reduced labor effort and reduced material usage, in turn, providing reduced footprint, reduced physical size of finished product, and reduced shipping costs relative to the conventional coiled energy absorbers. Further, the device 118, 402, 412, 422 is manufactured using the single step cutting process, such as the laser cutting process or the fluid jet cutting process, in turn, providing manufacturing ease and flexibility.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An energy absorbing device for use with a fall protection system, the energy absorbing device comprising:

a body having a first end and a second end, and defining a central axis therethrough, the body comprising:

a first path of reduced strength extending from the first end of the body to near the central axis of the body, the first path of reduced strength comprising a plurality of perforations extending through the body and disposed adjacent to each other, wherein the plurality of perforations is arranged in a first spiral shape; and a second path of reduced strength spaced apart from the first path of reduced strength, the second path of reduced strength extending from the second end of the body to near the central axis of the body, the second path of reduced strength having a second spiral shape;

wherein the second path of reduced strength is a groove that extends through the thickness of the body along the entirety of the second path of reduced strength from the second end of the body to near the central axis of the body;

a first region extending from the first end to near the central axis in a spiral shape and a second region extending from the second end to near the central axis in a spiral shape, the second region being concentric with the first region, wherein the first region and the second region are connected to each other via the first path of reduced strength and separated from each other via the second path of reduced strength prior to application of the force;

wherein, upon application of a force above a threshold at the first end and the second end in opposing directions, the body is configured to separate by tearing along the first path of reduced strength and by expansion of the groove of the second path of reduced strength to absorb energy.

2. The energy absorbing device of claim 1, wherein each of the plurality of perforations extends parallel to the central axis.

3. The energy absorbing device of claim 1, wherein the first spiral shape is concentric with the second spiral shape.

4. The energy absorbing device of claim 1, wherein the body further comprises:

a first hole disposed near the central axis and aligned with the first path of reduced strength; and a second hole disposed near the central axis and aligned with the second path of reduced strength.

5. The energy absorbing device of claim 1 further comprises:

a first coupler disposed on the first end of the body; and a second coupler disposed on the second end of the body, wherein at least one of the first coupler and the second coupler is adapted to be connected to a load to apply the force in opposing directions at the first end and the second end.

6. A horizontal lifeline system comprising:

at least a pair of anchor supports;

a safety line extending between at least the pair of anchor supports; and an energy absorbing device coupled operatively to the safety line, the energy absorbing device comprising:

a body having a first end and a second end, and defining a central axis therethrough, the body comprising:

a first path of reduced strength extending from the first end of the body to near the central axis of the body, the first path of reduced strength comprising a plurality of perforations extending through the body and disposed adjacent to each other, wherein the plurality of perforations is arranged in a first spiral shape; and a second path of reduced strength spaced apart from the first path of reduced strength, the second path of reduced strength extending from the second end of the body to near the central axis of the body, the second path of reduced strength having a second spiral shape;

wherein the second path of reduced strength is a groove that extends through the thickness of the body along the entirety of the second path of reduced strength from the second end of the body to near the central axis of the body a first region extending from the first end to near the central axis in a spiral shape and a second region extending from the second end to near the central axis in a spiral shape, the second region being concentric with the first region, wherein the first region and the second region are connected to each other via the first path of reduced strength and separated from each other via the second path of reduced strength prior to application of the force, wherein, upon application of a force above a threshold at the first end and the second end in opposing directions, the body is configured to separate by tearing along the first path of reduced strength and by expansion of the groove of the second path of reduced strength to absorb energy.

7. The horizontal lifeline system of claim 6, wherein the first spiral shape is concentric with the second spiral shape.

8. The horizontal lifeline system of claim 6, wherein the body further comprises:

a first hole disposed near the central axis and aligned with the first path of reduced strength; and a second hole disposed near the central axis and aligned with the second path of reduced strength.

9. The horizontal lifeline system of claim 6 further comprises:

a first coupler disposed on the first end of the body; and a second coupler disposed on the second end of the body, wherein at least one of the first coupler and the second coupler is adapted to be connected to a load to apply the force in opposing directions at the first end and the second end.

* * * * *